MULTICHANNEL COMMUNICATION RECEIVER WITH AUTOMATIC SAMPLING AND LOCK IN ON ONE CHANNEL

Filed Dec. 1, 1964

INVENTORS:
THOMAS A. McKEE,
RICHARD T. MYERS,
FRED E. SPANGLER,
KENNETH L. WRIGHT,
BY I. David Blumenfeld
THEIR ATTORNEY.

3,470,481
Patented Sept. 30, 1969

3,470,481

MULTICHANNEL COMMUNICATION RECEIVER WITH AUTOMATIC SAMPLING AND LOCK IN ON ONE CHANNEL

Richard T. Myers, Thomas A. McKee, Fred E. Spangler, and Kenneth L. Wright, Lynchburg, Va., assignors to General Electric Company, a corporation of New York Filed Dec. 1, 1964, Ser. No. 414,960
Int. Cl. H04b *1/32*
U.S. Cl. 325—470 8 Claims

ABSTRACT OF THE DISCLOSURE

A communication receiver including circuitry for automatically monitoring a plurality of channels and locking the receiver onto the channel which first receives a signal. The receiver is switched, at a predetermined rate, between the channels. A sequential scanning switch such as a free-running multivibrator switches the local oscillator frequency to inject local oscillator signals of frequencies suitable to receive the channels. The scanning switch continues to operate in this manner to sample the channels until a signal is received to interrupt operation of the scanning switch and hold the local oscillator signal at the frequency required to lock the receiver on the channel receiving the signal.

This invention relates to a communications receiver and, more particularly, to a communications receiver which includes circuitry for automatically monitoring a plurality of channels and locking the receiver onto the channel which first receives a signal.

In two-way mobile communications, and particularly in the industrial and public safety fields, it is often desirable for a communication receiver in a vehicle or at a base station to be able to receive and monitor two or more channels on which a communication from a base station or a vehicle may intermittently appear. To do so without requiring the operator to switch back and forth between the channels, some means must be provided for performing this function automatically. Hitherto, this was achieved by simultaneous monitoring. Two or more different local oscillator signals are applied simultaneously to two separate converters or mixers at the front end of the receiver. As soon as a signal appears on one of the channels, the operator disables one of the mixers and local oscillators thus switching the receiver to the active channel. Typical of such an arrangement is the one described in U.S. Patent No. 3,035,171, issued May 15, 1962, in the names of Arthur G. Manke and Junior I. Rhodes, and assigned to the General Electric Company, the assignee of the present invention.

While monitoring systems of the type described and illustrated in the Manke patent are eminently satisfactory for many purposes, the system has some limitations where solid-state, transistorized receivers are utilized. To a certain extent, all transistors are bilaterally conducting devices so that solid-state receivers are subject to a much greater degree of interaction between signals than tubed equipment. If separate local oscillator signals are concurrently applied for simultaneous monitoring, a certain amount of interference due to intermodulation must be expected due to the relatively poor isolation characteristic of transistorized receiver mixer circuits. In some circumstances, it is thus necessary to utilize an approach other than simultaneous monitoring.

Therefore, one of the principal objectives of this invention is to provide an automatic monitoring system for a communication receiver in which a plurality of channels are automatically monitored in a repetitive and predetermined sequence.

Another objective of the invention is to provide an automatic channel monitoring arrangement for a communication receiver in which a plurality of channels are sequentially monitored and the monitoring equipment disabled and the receiver locked on the channel on which the first signal transmission is received.

Other objectives and advantages of the invention will become apparent as the description thereof proceeds.

In accordance with the invention, the foregoing objectives are achieved by providing a communication receiver in which the plurality of channels are scanned by sequentially injecting local oscillator signals of suitable frequencies to receive the various channels. This sequential scanning proceeds at a predetermined rate until the receipt of a signal on one of the channels. The appearance of such a signal on one of the channels is utilized to generate a disable signal from the receiver which interrupts operation of the scanning or search circuit and holds the local oscillator signal at the frequency required to lock the receiver on the given channel. The channels are thus continuously monitored without intervention by an operator, and the receiver is automatically locked onto the channel first receiving a signal transmission and remains locked on the channel until the end of the signal transmission.

The novel features, which are believed to be characteristic of this invention, are set forth, with particularity, in the appended claims. The invention itself, both as to its organization and method of operation, together with further objects and advantages thereof, may best be understood by reference to the following description taken in connection with the accompanying drawings, in which:

Figure 1:
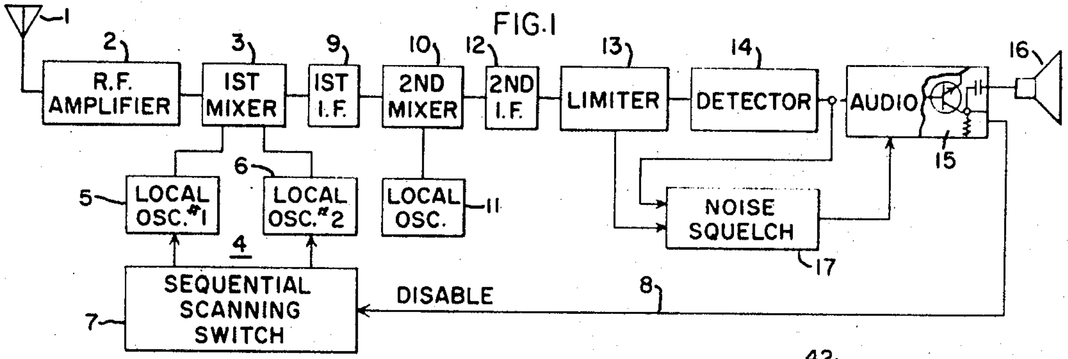
FIG. 1 is a block diagram of a communication receiver which includes the sequential monitoring and locking circuit arrangement.

FIG. 1 illustrates, in block diagram form, a typical double conversion, superheterodyne, communication receiver which includes a channel monitor scanning switch for the local oscillator so that local oscillator signals of different frequencies are sequentially applied to the receiver mixer. The receiver includes an antenna 1 for receiving angularly modulated or amplitude modulated signals on different channels (i.e., on different carrier frequencies) and one or more radio frequency amplifier stages 2 for amplifying the received signals. The output from radio frequency amplifier stages 2 is coupled to a first mixer or converter 3 along with signals from a source of local oscillations shown generally at 4. The local oscillator signal source includes local oscillators 5 and 6 for supplying local oscillator signals of different frequencies, $f_1$ or $f_2$, to mixer 3, the frequencies of the individual local oscillators being such that, when heterodyned with the various channels to be monitored, the output of the mixer is the desired intermediate frequency (I.F.) signal (such as 5.26 mc. for example). This sequential monitoring of the various channels is achieved by means of a sequential scanning switch, shown generally at 7, which alternately energizes local oscillators 5 and 6 to apply the different local oscillator signals to the mixer in time sequence. Operation of sequential scanning switch 7 is interrupted in a manner presently to be described by a disabling signal received over line 8 and generated in the receiver whenever a signal is received on one of the channels.

The output from mixer 3 is coupled to one or more I.F. amplifier stages 9. The amplified high I.F. signal is coupled to a second mixer 10 along with a signal from local oscillator 11 to convert the amplified first or high I.F. signal to a second or low I.F. signal (such as 455 kc.). The low I.F. signal is amplified in one or more second or low I.F. amplifier stages 12 and coupled, in the case of angularly modulated signals, to a limiter 13 where any amplitude modulations of the signal are removed. The limited signal is applied to a detector 14, such as a frequency discriminator in the case of angularly modulated signals, and the audio intelligence is extracted from the signal. The audio is then applied to one or more audio amplifying stages 15 and then to a reproducing device such as a speaker 16.

The receiver may also include a noise squelch arrangement, shown generally at 17, for muting the audio stages during intervals when no signal is being received thereby preventing the reproduction of highly irritating electrical noise. Such noise squelch or muting circuits are old and well known and typically include a noise filter network coupled to the output of the frequency detector. This noise filter has a passband outside of the audio frequency band and produces a noise voltage whenever the noise level in the system rises due to the absence of a signal. The noise voltage is rectified and amplified to produce a DC control signal which is used to bias the audio stages into cutoff. When a signal is received, the receiver noise level is reduced sufficiently so that the biasing voltage from noise squelch circuit 17 cannot mute the audio amplifier, unsquelching the receiver and permitting reproduction of the audio. A unidirection signal from the limiter, which is present whenever a signal is being received, is also used as a positive disabling signal for the noise squelch circuitry, although it will be obvious that the limiter disabling feature may be dispensed with.

The disable signal applied over line 8 to sequential scanning switch 7 is, in the embodiment shown in FIG. 1, obtained from receiver audio output stages 15. This control signal may, for example, be produced by rectifying the audio signal to provide a unidirectional signal of the proper polarity to disable sequential scanning switch 7. It will be apreciated that the disable signal for the scanning switch need not necessarily be taken from the audio stages. For example, the disable signal could equally be obtained from other parts of the receiver such as the limiter or from the noise squelch circuitry; in fact, any part of the receiver wherein receipt of a signal produces a change in an operating parameter. Disabling of switch 7 terminates switching of the local oscillator signals so that the local oscillator signal applied to mixer 3 is of the proper frequency to keep the receiver locked onto the channel.

It will also be understood, by those skilled int he art, that, although the arrangement of FIG. 1 illustrates two separate local oscillators 5 and 6 which are selectively energized by the scanning switch to apply the different local oscillator signals in sequence to mixer 3, the invention is not limited to this particular arrangement. It is obvious that a single oscillator capable of being switched electrically to a plurality of discrete frequencies may be used equally well. One example of such an arrangement is shown in FIG. 5 wherein a crystal controlled local oscillator is utilized which includes a plurality of crystals

18 and 19 resonant at different frequencies. Each of the crystals is connected in series with a unidirectional conducting device such as the diodes CR1 and CR2. A unidirectional voltage from switch 7 is sequentially connected to the diodes in series with the different crystals over input terminals A and B, which are connected respectively to the two output leads from scanning switch 7 of FIG. 1. The voltages are of the proper polarity to bias the diodes into conduction and, hence, connect the associated crystal to the oscillator. As the voltages are applied sequentially to the different diodes, different crystals are connected to the oscillator thereby suitably switching he local oscillator signal frequency to monitor the channels.

Figures 2, 4, 5:
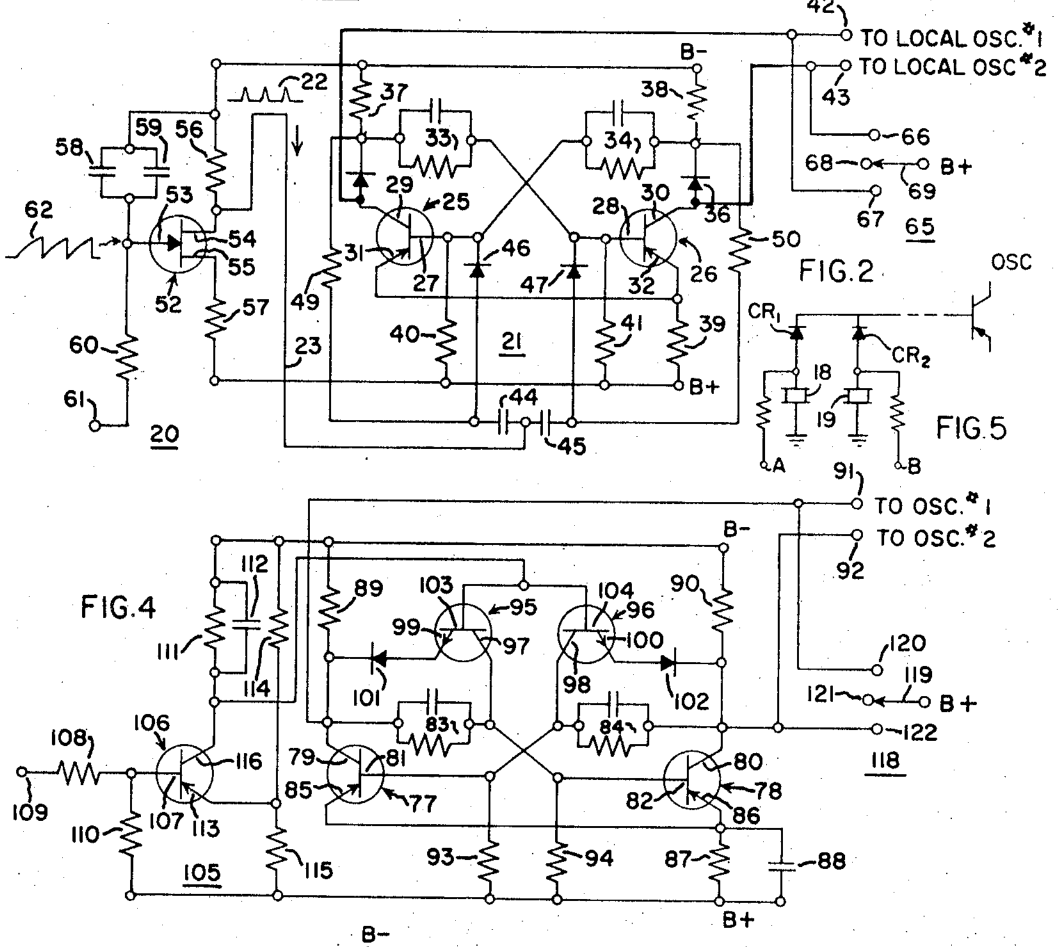
FIG. 2 is a circuit diagram of a preferred embodiment of a sequential scanning switch forming part of the monitoring circuit of FIG. 1.
FIG. 4 is a circuit diagram of an alternative embodiment of a sequential scanning switch.
FIG. 5 is a circuit diagram, in fragmentary form, illustrating an alternate means for injecting different local oscillator signals to the receiver.

FIG. 2 illustrates a preferred embodiment of a sequential scanning switch for switching the local oscillator signal. Sequential scanning switch 7 of FIG. 2 consists of a free-running pulse generator 20 and a bistable switching multivibrator 21 triggered by the pulses from the pulse generator. Pulse generator 20, in the absence of a disable signal, is a free-running relaxation oscillator which produces output pulses 22 at a predetermined repetition rate which may be in the order of 6–10 pulses per second. Trigger pulses 22 are applied over the lead 23 to the bistable switching multivibrator 21 to switch its stable state. Bistable multivibrator switch 21 includes two PNP transistors 25 and 26 having base electrodes 27 and 28, collector electrodes 29 and 30, and emitter electrodes 31 and 32. Transistors 25 and 26 are interconnected by RC networks 33 and 34 between collector 29 and base 28 and collector 30 and base 27. Operating potentials for the transistors are provided by connecting the collectors to a source of negative potential through diodes 35 and 36 and collector resistors 37 and 38, the emitters to the B+ supply bus through common emitter resistor 39, and the bases to the positive supply bus by resistors 40 and 41. The output switching voltages to local oscillators 1 and 2 are taken from output terminals 42 and 43 which are connected respectively to the collectors of transistors 25 and 26. Triggering pulses 22 from pulse generator 20 for reversing the stable states of the multivibrator 21 are applied to the bases of the transistors through coupling capacitors 44 and 45 and diodes 46 and 47.

The conducting states of transistors 25 and 26 are reversed by the periodic triggering pulses which alternately drive the transistors into saturation. The voltage at the collector of the transistor in the saturated state rises approximately to the voltage at the B+ bus, applying a positive voltage to its associated local oscillator over output terminals 42 or 43. Thus, if transistor 26 is in the conducting state and saturated, the voltage at collector 30, and the voltage applied to local oscillator 2 from terminal 43 is positive. The positive voltage at output terminal 43 enables local oscillator 6, and local oscillator signal $f_2$ is applied to the mixer, which signal is of the proper frequency to monitor channel 2. The multivibrator remains in this state until the appearance of the next triggering pulse at which time transistor 25 is driven into saturation, and transistor 26 is cut off. A positive voltage appears at terminal 42, and local oscillator signal $f_1$ is applied to the receiver to monitor channel 1. In the absence of a further triggering pulse, the switch remains in one or the other states indefinitely.

Diodes 46 and 47 are so poled that a positive triggering pulse can only be applied to the base of the conducting transistor and cannot be applied to the base of the nonconducting transistor. That is to insure, in a manner presently to be described, that the positive triggering pulses produce proper switching action. Diodes 35 and 36, in series with the collectors of the transistors, present a high impedance to the inactivated local oscillator means.

For purposes of explaining the operation of bistable transistor switch 21, assume that transistor 26 is conducting and in the saturated state, and transistor 25 is fully cut off. Collector 30, as pointed out previously, is approximately at the B+ potential since its collector-emitter resistance in the saturated state is extremely low, as is the resistance of fixed emitter resistor 39, both being in the order of a hundred ohms or so, while collector resistor 38 has a resistance of several thousand ohms. Base 27 of transistor 25, being connected to collector 30 through the resistor of network 34, is thus at the same or at a slightly positive potential with respect to its emitter. The base-emitter junction of transistor 25 is thus either reverse-biased, or at least not sufficiently forward-biased, for conduction, and transistor 25 is cut off. Output terminal 43, which is connected to the junction of collector resistance 38 and diode 36 of the conducting transistor, therefore, impresses a positive voltage on local oscillator 2, and a local oscillator signal $f_2$ is applied to the mixer. With transistor 26 conducting, diode 47, which is connected between the collector of transistor 26 and its base, is maintained in the conductive state since its anode is connected to B+ through resistor 50 and its cathode to a negative potential through the resistor of RC network 33. Diode 47 is thereby conditioned to pass a positive triggering pulse to the base of transistor 26. Diode 46, on the other hand, is reverse-biased as its anode is connected to the collector of transistor 25 which is essentially at the potential of the B− bus. A positive triggering pulse, therefore, cannot pass through diode 46 to the base of transistor 25. This is necessary lest the positive pulse be applied to the base of the nonconducting transistor and interfere with the switching. That is, since the nonconducting transistor is switched into conduction by applying a negative-going voltage to its base from the collector of the conducting transistor, that transistor is driven into cut-off by the positive trigger, and care must be taken to keep this positive triggering pulse away from the base of the nonconducting transistor during the switching period since such a positive pulse will oppose the negative-going voltage from the collector of the formerly conducting transistor preventing proper switching.

In the absence of a triggering pulse, the state of the transistor multivibrator switch 21 remains undisturbed with transistor 26 conducting and applying a positive enabling voltage to the local oscillator and transistor 25 cut off. The next positive triggering pulse 22 from pulse generator 20 is applied through coupling capacitor 25 and the conducting diode 47 to base 28 of transistor 26. As poined out previously, diode 46, which is coupled to the base of transistor 25, is reverse-biased, and the positive pulse 22 is blocked by the diode. The positive pulse applied to the base of PNP transistor 26 reduces its collector current since a positive voltage at the base reduces the forward-biasing of the base-emitter junction. The drop in collector current produces a corresponding drop in the collector potential from B+ towards B−. This voltage drop at the collector of transistor 26 is applied through RC network 34 to the base of transistor 25 driving it more negative and initiating a flow of collector current. The flow of collector current in transistor 26 raises the potential at the collector of 26 toward B+ by virtue of the voltage drop across collector resistor 37. The positive-going voltage at collector 29 of transistor 25 is applied through network 33 to base 28 of transistor 26 driving the base of PNP transistor 26 even more positive and further reducing its collector current so that its collector voltage continues to drop towards B−. This, in turn, makes the base electrode of transistor 25 more negative increasing its collector current flow. This process continues and very shortly the conducting states of the two transistors are reversed with transistor 25 conducting and in the saturated state, and transistor 26 cut off.

When transistor 25 is driven into saturation, the voltage at collector 29 rises approximately to B+, and this positive voltage appears at output terminal 42, and local oscillator #1 applies local oscillator signal $f_1$ to the receiver. The voltage at output terminal 43 is now negative, and local oscillator #2 is disabled. Transistor switch 21 remains in this state with transistor 25 fully on and transistor 25 fully on and transistor 26 cut off until the appearance of the next pulse at which time the sequence is repeated to switch the conducting states of these transistors. Thus, as bistable multivibrator 21 is periodically switched by triggering pulses 22, a positive voltage appears alternately at output terminals 42 and 43 sequentially applying local oscillator signals $f_1$ and $f_2$ to the receiver mixer and thereby sequentially monitoring the channels.

Pulse generator 20 is a relaxation oscillator in which a unijunction transistor 52, having an emitter electrode 53 and a pair of base electrodes 54 and 55, is utilized as a discharge device. Base electrodes 54 and 55 are connected through base resistors 56 and 57 to the B− and B+ buses. An RC time constant network establishes the repetition rate of the triggering pulses by controlling the voltage level at emitter 53 and, hence, the rate at which the unijunction transistor is driven into conduction. The RC network includes two shunt connected storage capacitors 58 and 59 connected between the emitter 53 and the B− bus and a charging resistor 60 connected between the emitter and disable input terminal 61. In the absence of a disable signal, a positive voltage is applied to terminal 61, and storage capactors 58 and 59 charge through resistor 60 towards the positive potential at the terminal. The voltage at emitter 53 rises from B− toward B+ as the capacitors charge. When the voltage reaches a predetermined value, depending on the nature and characteristics of the unijunction transistor, the emitter junction becomes forward-biased, and unijunction transistor 52 conducts, rapdly discharging capacitors 58 and 59. This rapid discharge also produces an instantaneous current flow through base resistor 56, and a short positive voltage impulse 22 is produced at base 54 which is applied over lead 23 as a triggering pulse for switching multivibrator 21. After the capacitors have discharged, the emitter junction is again reverse-biased, and capacitors 58 and 59 again begin to charge through resistor 60 towards the positive voltage at terminal 61. This cycle is repeated when the voltage at the junction of the capacitors and resistors again reaches a value which forward-biases emitter 53. The voltage variations at emitter 53 are ilvariations at base 54 are shown to be the triggering pulses lustrated by the sawtooth wave 62, whereas the voltage 22 for switching multivibrator 21.

Unijunction transistor 52 is a three terminal semiconductor device having two ohmic contacts, the base 54 and 55, at opposite ends of a small bar of "N" type silicon. A single rectifying contact, the emitter 53, is made on the opposite side of the bar close to base 55. An interbase resistance of somewhere between five and ten thousand ohms exist between bases 54 and 55. With no emitter current flowing, i.e., with the rectifying emitter junction reverse-biased, the silicon bar between bases 54 and 55 acts like a simple voltage divider, and a certain fraction $\eta$ of the voltage $V_{BB}|(B+)-B-)|$ between the two bases appears at the emitter. If the externally applied emitter voltage is less than (i.e., more negative) this fraction $\eta V_{BB}$ (customarily referred to as the intrinsic stand-off ratio), the emitter is reverse-biased and only a small emitter leakage current flows. If the externally applied emitter voltage exceeds $\eta V_{BB}$, emitter 53 is forward-biased and emitter current flows. This emitter current consists primarily of holes injected into the silicon bar. These holes move down the bar from the emtter to base 54 and result in an equal increase in the number of electrons in the emitter to base 54 region. The net result is a decrease in resistance between emitter and base 54 so that, as the emitter current increases, the emitter voltage decreases, and a negative resistance characteristic is obtained rapidly discharging the storage capacitors.

Resistor 60 and capacitors 58 and 59 form a network for periodically producing a voltage at emitter 53 which exceeds the intrinsic stand-off ratio thereby forward-biasing the unijunction transistor. As can be seen from the above description, this circuit arrangement is a relaxation oscillator in that the RC network will periodically drive the transistor 52 into conduction which, in turn, discharges the capacitors and reduces the emitter voltage so that the cycle starts again. The period of the relaxation oscillations, and hence the pulse repetition frequency, is controlled by the RC network, the intrinsic stand-off ratio of the unijunction, and the magnitude of the base voltage $V_{BB}$ is applied across bases 54 and 55 of unijunction transistor 52.

The pulse generator remains free-running as long as the potential at terminals 61 remain positive, indicating that no signals are being received on any of the channels and monitoring is to continue. As soon as a signal is received on one of the channels, a negative disable voltage, substantially equal to the negative voltage on the B— bus, is impressed on disable input terminal 61. Since the potentials at the B— bus and at terminal 61 are now equal and of the same polarity capacitors 58 and 59 do not charge, and the emitter junction is, and remains reverse-biased. The relaxation oscillator is inoperative, and no further triggering pulses are generated until the negative voltage disappears from input terminal 61.

When the pulse generator is disabled, multivibrator 21 remains locked in the state into which it was last switched. For example, if transistor 26 was in the conducting state, a positive enabling voltage from output terminal 43 is applied to local oscillator 2, and a local oscillator signal $f_2$ is applied to the receiver mixer 31 so that channel 2 is monitored. If during this interval a signal is received on channel 2, a negative voltage appears on lead 8 and at input terminal 61 of pulse generator 20. This negative voltage disables pulse generator 20 thus locking multivibrator 21 into its then state, with transistor 26 conductive and local oscillator signal $f_2$ applied to the receiver. As long as a signal is being received on channel 2, the scanning switch remains disabled and the receiver remains locked on channel 2. As soon as the signal on channel 2 disappears, the negative disable voltage disappears and a positive voltage is again impressed on input terminal 61. Capacitors 58 and 59 begin charging through resistor 60 and unijunction transistor 52 is periodically driven into the conducting state to generate further triggering pulses which trigger switching multivibrator 21 to initiate sequential monitoring of channels 1 and 2. This sequential monitoring or searching of the channels continues until the appearance of the next signals on one of the channels at which time the sequential scanning system again locks onto and maintains the channel on which a signal is being received.

There may be occasions when it is desired to override the automatic sequential monitoring circuitry, even though no signal is being received, as for example if the operator wishes to stay on one channel permanently. To this end, a manual override switch shown generally at 65 is provided. This switch consists of three contacts 66, 67, and 68 and a movable arm 69 connected to a source of positive voltage B+. With arm 69 on center contact 67, override switch 65 is disabled and has no effect on the sequential monitoring circuitry which operates in the normal manner. If the operator desires to switch the receiver to monitor channel 1 only, arm 69 is moved to contact 67. The positive voltage at output terminal 42 actuates local oscillator 1 thereby applying local oscillator signal $f_1$ to the mixer and causing the receiver to monitor channel 1. The positive voltage on contact 67 also locks multivibrator scanning switch 21 into the state where transistor 25 is conducting and remains conducting. For example, assume that at the time the arm of the manual override switch is moved to contact 67, transistor 26 is conducting. The positive voltage is applied to the collector of transistor 25 and thence through the RC network 33 to the base of transistor 26. This positive voltage applied to the base of the PNP transistor drives it into cut-off since it reverse-biases the emitter junction. The collector current decreases and the voltage at collector 30 drops to the B— voltage. A negative-going potential is thus applied to base 27 of PNP transistor 25 switching that transistor into the conducting state where it remains as long as movable arm 69 is positioned against contact 67. Similarly, if arm 69 is moved to contact 66, local oscillator 2 is actuated and local oscillator signal $f_2$ is injected into the receiver to monitor channel 2. This positive voltage drives transistor 26 into conduction, if it is not already there, and maintains it in that state until the manual override switch is disabled by moving arm 69 to the center contact 68.

Figure 3:
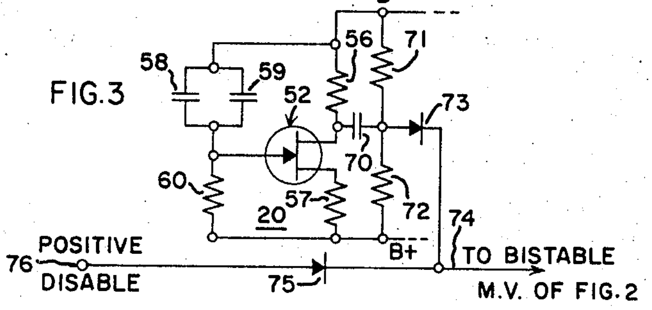
FIG. 3 is a fragmentary showing of an alternative construction of one portion of the switch of FIG. 2.

FIG. 3 is a fragmentary showing of another form of pulse generators illustrated in FIG. 2, in which corresponding elements are designated by the same numerals. FIG. 3 illustrates a pulse generator and diode output coupling circuit for the positive trigger pulses in which the coupling circuit is blocked by disable signal to prevent transmission of the pulses to the multivibrator. It will be recalled that in the system of FIG. 2 the pulse generator itself is disabled to terminate switching, whereas, in FIG. 3, the pulse generator remains in the free-running state, while the pulse coupling for the switching multivibrator is disabled. Thus, in FIG. 3, the pulse generator again includes a unijunction transistor 52, the base electrodes of which are connected through base resistors 56 and 57 to the B— and B+ buses and the emitter of which is connected to the junction of an RC network consisting of the charging resistor 60 connected to the B+ bus. The output pulses at the base of unijunction transistor 52 are coupled through coupling capacitor 70 to the junction of a voltage divider consisting of resistors 71 and 72 connected between the B+ and B— buses. A diode 73, poled to pass positive pulses, is connected between the junction of this voltage divider and lead 74 which is connected to a bistable switching multivibrator such as the one illustrated in FIG. 2. Diode 73 may be disabled to block triggering pulses by means of a disabling circuit which includes a second diode 75 connected to a disable input terminal 76. Input terminal 76 is again connected to one of the receiver stages and, in this embodiment, has a positive disable voltage applied thereto whenever a signal is received. This positive voltage forward-biases diode 75 and applies positive voltage from terminal 76 to the cathode of diode 73. Diode 73 is thus reverse-biased, blocking the positive triggering pulses. In the absence of a signal, input terminal 76 is either at ground or at a negative potential, reverse-biasing diode 75 and permitting diode 73 to pass the positive triggering pulses.

FIG. 4 is yet another embodiment of a sequential scanning switch for monitoring a plurality of channels. It differs from those shown in FIGS. 2 and 3 in that the switching multivibrator is a free-running multivibrator which is locked into a stable state by a pair of clamping transistors. The free-running multivibrator consists of a pair of PNP transistors 77 and 78 with their collectors 79 and 80 cross-coupled to bases 8 1and 82 through the RC timing networks 83 and 84. Operating potential is provided by connecting emitters 85 and 86 to the B+ bus through common emitter resistor 87 (by-passed for AC by capacitor 88), collectors 79 and 80 to the B— bus through collector resistors 89 and 90, and bases 81 and 82 to B+ through the base resistors 93 and 94. The free-running multivibrator automatically reverses the conductive states of transistors 77 and 78 at a rate essentially determined by the RC time constant of networks 83 and 84. The conductive states of the transistors, as described previously, determine which of output terminals 91 and 92 is positive and controls application of local oscillator signals $f_1$ and $f_2$ to the mixer to monitor channels 1 and 2.

Clamping transistors 95 and 96 are provided to stop free-running operation of the multivibrator upon appearance of a disable signal and to lock the receiver on the channel on which a signal is first received. Transistors 95 and 96 are NPN transistors having collectors 97 and 98 which are respectively connected to the collectors of transistors 77 and 78. Emitters 99 and 100 are also connected through protective diodes 101 and 102, which prevent damage to the transistors from excessive base-emitter reverse-bias, to the collectors of transistors 77 and 78. Bases 103 and 104 are connected to the output of DC amplifier 105 which controls the clamping transistors. DC amplifier 105 includes a PNP transistor 106 having a base 107 connected through a resistor 108 to disable input terminal 109. Operating potential is provided by connecting base 107 to the B+ bus through base resistor 110, the collector 116 to the B− bus through by-passed collector resistor 111, while emitter 113 is connected to the junction of a voltage divider comprising the resistors 114 and 115 between the B− and B+ buses. The biasing for collector, emitter and base is such that the emitter is less positive than the base, and under normal conditions the DC amplifier is cut-off, and the voltage at collector 116 is almost at B−. Upon appearance of a negative disabling voltage at input 109, base 107 becomes more negative increasing the collector current and the voltage drop across collector resistor 111. The voltage at collector 116 becomes more positive and provides a control voltage for the clamping transistors to stop the free-running operation of the multivibrators locking it into one stable state.

The circuit operation is as follows: If transistor 77 is conducting, the channel 1 oscillator is energized since a positive voltage appears at output terminal 91 thereby applying local oscillator signal $f_1$ to the mixer to monitor channel 1. With transistor 77 conducting, its associated clamping transistor 95 cannot conduct even if a control voltage is present at the output of DC amplifier 105 since collector 97 and emitter 99 are essentially at the same potential, i.e., at the voltage of collector 79 of transistor 77 to which they are individually connected by the resistor of timing network 83 and diode 101. Clamping transistor 96, on the other hand, is capable of conducting since its collector 98 is connected to the B+ terminal through base resistor 93, and its emitter is connected to the B− lead through diode 102 and collector resistor 90.

If a disable signal appears at input terminal 109, collector 116 of transistor 115 goes more positive, applying a positive voltage to the bases of clamping transistors 95 and 96. The base of clamping transistor 96 is now positive which forward-biases the base-emitter junction driving transistor 96 into conduction and reducing its collector-emitter resistance to a very low value. This clamps the base 81 of the conducting transistor 77 to the B− terminal through the collector-emitter path of clamping resistor 96, diode 102 and collector resistor 90 of transistor 77. Thus, upon the appearance of the disable signal, clamping transistor 96 clamps the base of PNP transistor 77 to a negative potential locking the transistor in the conducting state as long as the disable signal is present. If the disable signal appears with the conducting state of the multivibrator reversed, i.e., if transistor 78 is conducting and transistor 77 is cut off, clamping transistor 96 would be incapable of conducting, for in that event both its collector and emitter would be at the B+ potential whereas clamping transistor 95 would conduct when a positive voltage from DC amplifier 105 is applied to base 104. When transistor 95 conducts, it clamps base 82 of transistor 78 to the B− terminal through the low resistance emitter-collector path of clamping transistor 95, diode 101 and collector-resistor 89.

The sequential scanning switch of FIG. 4 also contains a manually operated override switch comprising a movable contact arm 119 connected to a positive supply source B+ and three contacts 121, 122, and 123. Movement of arm 119 to contacts 120 or 122 locks the local oscillator onto either channel 1 or 2 and disables the switching free-running multivibrator in the manner described in the connection with the description of the switch of FIG. 2.

As an illustration, and not by way of limitation, the following sequential scanning switches of the types shown in FIGS. 2–4 were constructed and operated to provide a scanning rate of 6–10 c.p.s. with the circuit components having the following values:

FIG. 2

Resistors

| | |
|---|---|
| $R_{33}$ | 10 KΩ |
| $R_{34}$ | 10 KΩ |
| $R_{37}$ | 6.8 KΩ |
| $R_{38}$ | 6.8 KΩ |
| $R_{39}$ | 100Ω |
| $R_{40}$ | 10 KΩ |
| $R_{41}$ | 10 KΩ |
| $R_{49}$ | 20 KΩ |
| $R_{50}$ | 20 KΩ |
| $R_{56}$ | 100Ω |
| $R_{57}$ | 510Ω |
| $R_{60}$ | 200 KΩ |

Capacitors

| | |
|---|---|
| $C_{33}$ | 100 μμf. |
| $C_{34}$ | 100 μμf. |
| $C_{44}$ | .01 μf. |
| $C_{45}$ | .01 μf. |
| $C_{58}$ | .33 μf. |
| $C_{59}$ | .33 μf. |

Supply voltages

| | |
|---|---|
| B+, volts | +10 |
| B−, volts | −10 |

Devices—Transistors

| | |
|---|---|
| $Q_{25}$ | Silicon, PNP, type 2N1024. |
| $Q_{26}$ | Silicon, PNP, type 2N1024. |
| $Q_{52}$ | Silicon, unijunction, type 2N2646. |

Diodes

| | |
|---|---|
| $CR_{35}$ | Silicon, type 1N456. |
| $CR_{36}$ | Silicon, type 1N456. |
| $CR_{46}$ | Silicon, type 1N456. |
| $CR_{47}$ | Silicon, type 1N456. |

FIG. 3

Parts corresponding to FIG. 2 and having the same part number have same values.

Resistors

| | |
|---|---|
| $R_{71}$ | 1.5K |
| $R_{72}$ | 2.4K |

Capacitors

| | |
|---|---|
| $C_{70}$ | .022 μf. |

Devices

| | |
|---|---|
| $CR_{74}$ | Silicon diode, type 1N90. |
| $CR_{75}$ | Silicon diode, type 1N90. |

FIG. 4

Resistors

| | |
|---|---|
| $R_{83}$ | 8.2 KΩ |
| $R_{84}$ | 8.2 KΩ |
| $R_{87}$ | 100Ω |
| $R_{89}$ | 1.8 KΩ |
| $R_{90}$ | 1.8 KΩ |
| $R_{93}$ | 18 KΩ |
| $R_{94}$ | 18 KΩ |
| $R_{108}$ | 4.7 KΩ |
| $R_{110}$ | 5.1 KΩ |
| $R_{111}$ | 20 KΩ |
| $R_{114}$ | 1.8 KΩ |
| $R_{115}$ | 1 KΩ |

Capacitors

| | |
|---|---|
| $C_{83}$ | 3 μf. |
| $C_{84}$ | 3 μf. |
| $C_{88}$ | .22 μf. |
| $C_{112}$ | 20 μf. |

Supply voltages

| | |
|---|---|
| B+, volts | +10 |
| B−, volts | −10 |

Devices

| | |
|---|---|
| $Q_{77}$ | Alloy junction PNP, type 2N324. |
| $Q_{78}$ | Alloy junction PNP, type 2N324. |
| $Q_{95}$ | Alloy junction PNP, type 2N706. |
| $Q_{96}$ | Alloy junction PNP, type 2N706. |

Diodes

| | |
|---|---|
| $CR_{101}$ | Silicon diode, type 1N90. |
| $CR_{102}$ | Silicon diode, type 1N90. |

It will also be apparent to those skilled in the art that the various switching circuits may be constructed with transistors of different conductivity types without going outside of the scope of this invention.

While a number of embodiments of the invention have been shown, it will, of course, be understood that the invention is not limited thereto since many modifications, both in circuit arrangement and in the instrumentality employed, may be made, and it is, therefore, contemplated by the appended claims to cover any such modifications that come within the true spirit and scope of this invention.

What is claimed as new and desired to be secured by Letters Patent of the United States is:

1. In a communication receiver capable of receiving a plurality of predetermined, individual channels to the exclusion of all others and including amplifying, converting, detecting, and reproducing stages, the combination comprising,
   (a) switched local oscillator means coupled to said converting stage, said local oscillator means being capable of providing a plurality of predetermined, discrete, selected local oscillator signals of different frequencies to convert the various channels to the same intermediate frequency;
   (b) means for sequentially monitoring said plurality of channels including switch means coupled to said local oscillator means for switching the local oscillator signal frequency to the selected, discrete values in a predetermined sequence to thereby monitor the individual channels in the same sequence;
   (c) means responsive to the receipt of a signal transmission on one of said channels to terminate the switching and lock said receiver on the one said channel, including
      (1) means to produce a control signal from one of said receiver stages in response to a received signal transmission; and
      (2) means to couple said control signal to said local oscillator switching means to disable said switching means and hold it in the condition in which said signal transmission is received to terminate switching of the local oscillator frequency and thereby locking said receiver onto the receiving channel.

2. A communication receiver, according to claim 1, wherein said local oscillator means includes a plurality of local oscillators which are selectively activated by said switching means to supply said plurality of discrete, selected frequencies to thereby sequentially monitor said channels.

3. A communication receiver, according to claim 1, wherein said local oscillator means includes a plurality of discrete frequency-determining elements which are selectively connected into operative relationship with said local oscillator means by said switching means to switch the local oscillator frequencies and monitor said channels.

4. A communication receiver, according to claim 1, wherein said means for sequentially switching the local oscillator frequency includes a multivibrator which alternately changes its conducting states to produce control voltages in response to changes in said conducting states to switch the local oscillator means.

5. A communication receiver, according to claim 1, wherein said local oscillator switching means include,
   (a) a bistable multivibrator coupled to said local oscillator means;
   (b) a pulse generator coupled to said multivibrator for producing triggering pulses to reverse the stable states of said multivibrator thereby alternately applying control voltages to switch the local oscillator signal frequencies; and
   (c) means coupling the control signal from said receiver to said pulse generator to interrupt application of trigger pulses to the multivibrator causing it to remain in one of its stable states and locking the receiver onto the channel which first receives a signal transmission.

6. A communication receiver, according to claim 5, wherein said control signal is applied directly to said pulse generator to disable said pulse generator.

7. A communication receiver, according to claim 5, wherein said pulse generator is coupled to said multivibrator through a diode poled to pass said triggering pulses, said control signal being applied to said diode to reverse-bias the same and terminate passage of the triggering pulses to said multivibrator.

8. A communication receiver, according to claim 1, wherein said local oscillator switching means includes,
   (a) a free-running multivibrator coupled to said local oscillator means; and
   (b) clamping means coupled to said multivibrator and responsive to said control signal to terminate free-running operation.

References Cited

UNITED STATES PATENTS

| | | | |
|---|---|---|---|
| 2,486,551 | 11/1949 | Boothroyd | 325—470 |
| 2,889,454 | 6/1959 | Hoffman et al. | 328—196 XR |
| 3,037,114 | 5/1962 | Bier et al. | 328—196 XR |
| 3,189,829 | 6/1965 | Bento et al. | 325—470 |
| 3,274,494 | 9/1966 | Stanley | 325—469 XR |
| 2,669,712 | 2/1954 | Rial | 325—307 XR |

RICHARD D. MURRAY, Primary Examiner

R. S. BELL, Assistant Examiner

U.S. Cl. X.R.

325—432, 31